United States Patent
Amdahl et al.

(10) Patent No.: US 12,365,556 B2
(45) Date of Patent: Jul. 22, 2025

(54) REFILLABLE LAMINATING FILM CARTRIDGE SYSTEM AND REFILL THEREOF

(71) Applicant: ACCO BRANDS CORPORATION, Lake Zurich, IL (US)

(72) Inventors: Samuel Paul Amdahl, Prospect Heights, IL (US); Aaron Melamed, Chicago, IL (US); Adam Himmelspach, Spring Grove, IL (US)

(73) Assignee: ACCO BRANDS CORPORATION, Lake Zurich, IL (US)

( * ) Notice: Subject to any disclaimer, the term of this patent is extended or adjusted under 35 U.S.C. 154(b) by 738 days.

(21) Appl. No.: 17/686,176

(22) Filed: Mar. 3, 2022

(65) Prior Publication Data
US 2022/0281709 A1 Sep. 8, 2022

Related U.S. Application Data

(60) Provisional application No. 63/156,698, filed on Mar. 4, 2021.

(51) Int. Cl.
*B65H 16/02* (2006.01)
*B32B 37/00* (2006.01)
*B65H 16/06* (2006.01)

(52) U.S. Cl.
CPC ....... *B65H 16/021* (2013.01); *B32B 37/0053* (2013.01); *B65H 16/06* (2013.01);
(Continued)

(58) Field of Classification Search
CPC .... B65H 16/005; B65H 16/02; B65H 16/021; B65H 16/06; B65H 2405/40; B65H 2405/42; B65H 2405/421; B65H 2405/43; B65H 2405/20; B65H 2405/21; B65H 2405/212; B65H 2405/214; B65H 2405/22; B65H 2701/1722; B65H 2701/1842; B65H 2301/4128; B41J 15/04; B41J 15/044; B32B 37/0046; B32B 37/053;
(Continued)

(56) References Cited

U.S. PATENT DOCUMENTS

D318,065 S 7/1991 Kamoda
5,536,094 A * 7/1996 Kondo ................. B65D 85/672
206/393
(Continued)

*Primary Examiner* — Anna M Momper
*Assistant Examiner* — Raveen J Dias
(74) *Attorney, Agent, or Firm* — Michael Best & Friedrich LLP

(57) ABSTRACT

A dual roll laminating film cartridge refill for a reusable cartridge loadable in a laminating machine. The refill includes a first roll of continuous adhesive-coated translucent laminating film having a first axial end and a second axial end. The refill includes a second roll of continuous adhesive-coated translucent laminating film having a first axial end and a second axial end. A first connector couples the first axial ends of the first and second rolls at a predefined gap distance. A second connector is independent from and spaced from the first connector, the second connector coupling the second axial ends of the first and second rolls at the predefined gap distance. The first and second connectors are uniquely shaped and asymmetrical to provide a keyed interface to the reusable cartridge.

20 Claims, 12 Drawing Sheets

(52) U.S. Cl.
CPC .. *B65H 2301/4128* (2013.01); *B65H 2405/20* (2013.01); *B65H 2405/42* (2013.01); *B65H 2701/1722* (2013.01); *B65H 2701/1842* (2013.01)

(58) Field of Classification Search
CPC ........ B32B 37/0069; B32B 2037/0061; B65D 85/66; B65D 85/67; B65D 85/676
See application file for complete search history.

(56) References Cited

U.S. PATENT DOCUMENTS

| | | | |
|---|---|---|---|
| D420,696 S | 2/2000 | Yung et al. | |
| 6,294,033 B1* | 9/2001 | Fukuoka | B32B 37/226 156/64 |
| 6,427,744 B2* | 8/2002 | Seki | B65C 9/40 156/364 |
| 6,431,243 B1* | 8/2002 | Ito | B32B 37/226 156/582 |
| 6,431,244 B1* | 8/2002 | Moriguchi | B32B 37/226 156/582 |
| 6,550,516 B2* | 4/2003 | Moriguchi | B32B 37/226 156/582 |
| 6,675,855 B1* | 1/2004 | Lemens | B32B 37/226 156/583.1 |
| 6,698,487 B2* | 3/2004 | Lemens | B32B 37/226 156/582 |
| 6,843,296 B2 | 1/2005 | Lemens et al. | |
| 6,868,889 B2 | 3/2005 | Kvamme et al. | |
| 7,022,203 B2* | 4/2006 | Messina | B32B 37/0046 156/583.1 |
| D529,541 S | 10/2006 | Kawai | |
| D539,842 S | 4/2007 | Minami et al. | |
| D541,854 S | 5/2007 | Motoki | |
| D544,536 S | 6/2007 | Motoki et al. | |
| D545,358 S | 6/2007 | Motoki | |
| D545,883 S | 7/2007 | Yamamoto et al. | |
| 7,261,790 B2 | 8/2007 | Hoffman et al. | |
| D588,190 S | 3/2009 | Kamimura et al. | |
| D595,343 S | 6/2009 | Ishikawa et al. | |
| D597,129 S | 7/2009 | Tatsumi et al. | |
| D598,491 S | 8/2009 | Kusudo et al. | |
| D599,399 S | 9/2009 | Hattori | |
| D631,088 S | 1/2011 | Chadani et al. | |
| D631,089 S | 1/2011 | Chadani et al. | |
| D631,090 S | 1/2011 | Chadani et al. | |
| D631,091 S | 1/2011 | Chadani et al. | |
| D637,225 S | 5/2011 | Kishi et al. | |
| D674,839 S | 1/2013 | Sakano et al. | |
| D694,816 S | 12/2013 | Fukamachi et al. | |
| D723,614 S | 3/2015 | Shimizu et al. | |
| D728,014 S | 4/2015 | Lee et al. | |
| D739,666 S | 9/2015 | Schofield | |
| D746,903 S | 1/2016 | Kitagawa et al. | |
| D746,906 S | 1/2016 | Kitagawa et al. | |
| D772,336 S | 11/2016 | Fan et al. | |
| D786,968 S | 5/2017 | Uratani et al. | |
| D788,213 S | 5/2017 | Maeshima et al. | |
| D789,446 S | 6/2017 | Maeshima et al. | |
| D795,340 S | 8/2017 | Taguchi et al. | |
| D796,573 S | 9/2017 | Li et al. | |
| D798,948 S | 10/2017 | Toba et al. | |
| D798,949 S | 10/2017 | Toba et al. | |
| D806,788 S | 1/2018 | Murase | |
| D819,123 S | 5/2018 | Kitagawa et al. | |
| D832,339 S | 10/2018 | Toba et al. | |
| D832,340 S | 10/2018 | Yang et al. | |
| D833,519 S | 11/2018 | Yang et al. | |
| D833,520 S | 11/2018 | Yang et al. | |
| D840,467 S | 2/2019 | Lu et al. | |
| D843,443 S | 3/2019 | Kawai et al. | |
| D845,384 S | 4/2019 | Oguma et al. | |
| D849,131 S | 5/2019 | Shimizu et al. | |
| D872,786 S | 1/2020 | Monteleone | |
| D907,081 S | 1/2021 | Monteleone | |
| 10,953,646 B2 | 3/2021 | Melamed | |
| D921,731 S | 6/2021 | Monteleone | |
| 2002/0059980 A1* | 5/2002 | Lemens | B32B 37/226 156/530 |
| 2002/0166639 A1* | 11/2002 | Moriguchi | B32B 37/226 156/582 |
| 2004/0045677 A1* | 3/2004 | Lemens | B32B 37/226 156/559 |
| 2004/0045678 A1* | 3/2004 | Lemens | B65H 75/185 156/583.1 |
| 2004/0050500 A1* | 3/2004 | Lemens | B32B 37/226 156/582 |
| 2004/0050501 A1* | 3/2004 | Lemens | B65H 75/185 156/580 |
| 2004/0163752 A1 | 8/2004 | Hoffman et al. | |
| 2005/0098268 A1* | 5/2005 | Messina | B32B 37/0046 156/60 |
| 2006/0260740 A1* | 11/2006 | Lammers | B32B 38/0004 156/522 |
| 2010/0307690 A1 | 12/2010 | Chou | |
| 2010/0329766 A1* | 12/2010 | Cahill | B41J 15/044 400/613 |
| 2015/0053351 A1 | 2/2015 | Tanaka | |
| 2015/0165797 A1* | 6/2015 | Chari | B41J 32/00 347/104 |
| 2018/0263434 A1* | 9/2018 | Babikian | A47K 10/38 |
| 2019/0143663 A1* | 5/2019 | Sugata | B32B 41/00 156/378 |
| 2020/0130341 A1 | 4/2020 | Melamed | |
| 2020/0189869 A1* | 6/2020 | Osborne, Jr. | A47K 10/38 |
| 2021/0309002 A1* | 10/2021 | Melamed | B32B 41/00 |
| 2021/0318656 A1* | 10/2021 | Ichikawa | G03G 21/16 |
| 2022/0143966 A1* | 5/2022 | Mori | B32B 37/025 |
| 2022/0306416 A1* | 9/2022 | Ichikawa | B65H 7/20 |
| 2024/0359449 A1* | 10/2024 | Newell | G03G 15/6582 |

* cited by examiner ized a laminating system for use with a cartridge system of the present disclosure.
REFILLABLE LAMINATING FILM CARTRIDGE SYSTEM AND REFILL THEREOF

CROSS-REFERENCE TO RELATED APPLICATIONS

This application claims priority to U.S. Provisional Patent Application No. 63/156,698, filed Mar. 4, 2021, the entire contents of which are incorporated by reference herein.

BACKGROUND

The present disclosure relates to laminating systems for laminating paper, cards, photos, or the like within a pair of transparent films by applying pressure and heat. Such machines are provided with adjustable settings for ensuring acceptable lamination results with a variety of different films having different specifications such as thickness, which may require different settings. This not only provides an opportunity for error in setup and poor results, but can be burdensome where the user(s) may need to switch among film types for various jobs.

SUMMARY

In one aspect, the invention provides a dual roll laminating film cartridge refill for a reusable cartridge loadable in a laminating machine. The refill includes a first roll of continuous adhesive-coated translucent laminating film having a first axial end and a second axial end. The refill includes a second roll of continuous adhesive-coated translucent laminating film having a first axial end and a second axial end. A first connector couples the first axial ends of the first and second rolls at a predefined gap distance. A second connector is independent from and spaced from the first connector, the second connector coupling the second axial ends of the first and second rolls at the predefined gap distance. The first and second connectors are uniquely shaped and asymmetrical to provide a keyed interface to the reusable cartridge.

In another aspect, the invention provides a dual roll laminating film cartridge including the dual roll laminating film cartridge refill and a reusable cartridge portion. The cartridge refill is releasably retained in the reusable cartridge portion and removable therefrom without destructive means.

In yet another aspect, the invention provides a dual roll laminating film cartridge refill for a reusable cartridge loadable in a laminating machine. The refill includes a first roll of continuous adhesive-coated translucent laminating film having a first axial end and a second axial end. The refill includes a second roll of continuous adhesive-coated translucent laminating film having a first axial end and a second axial end. A first connector couples the first axial ends of the first and second rolls at a predefined gap distance. A second connector is independent from and spaced from the first connector, the second connector coupling the second axial ends of the first and second rolls at the predefined gap distance. Wear surfaces of the refill are configured to contact and press upon respective spool ends of the first and second rolls to create resistance in dispensing the laminating film from the respective first and second rolls.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
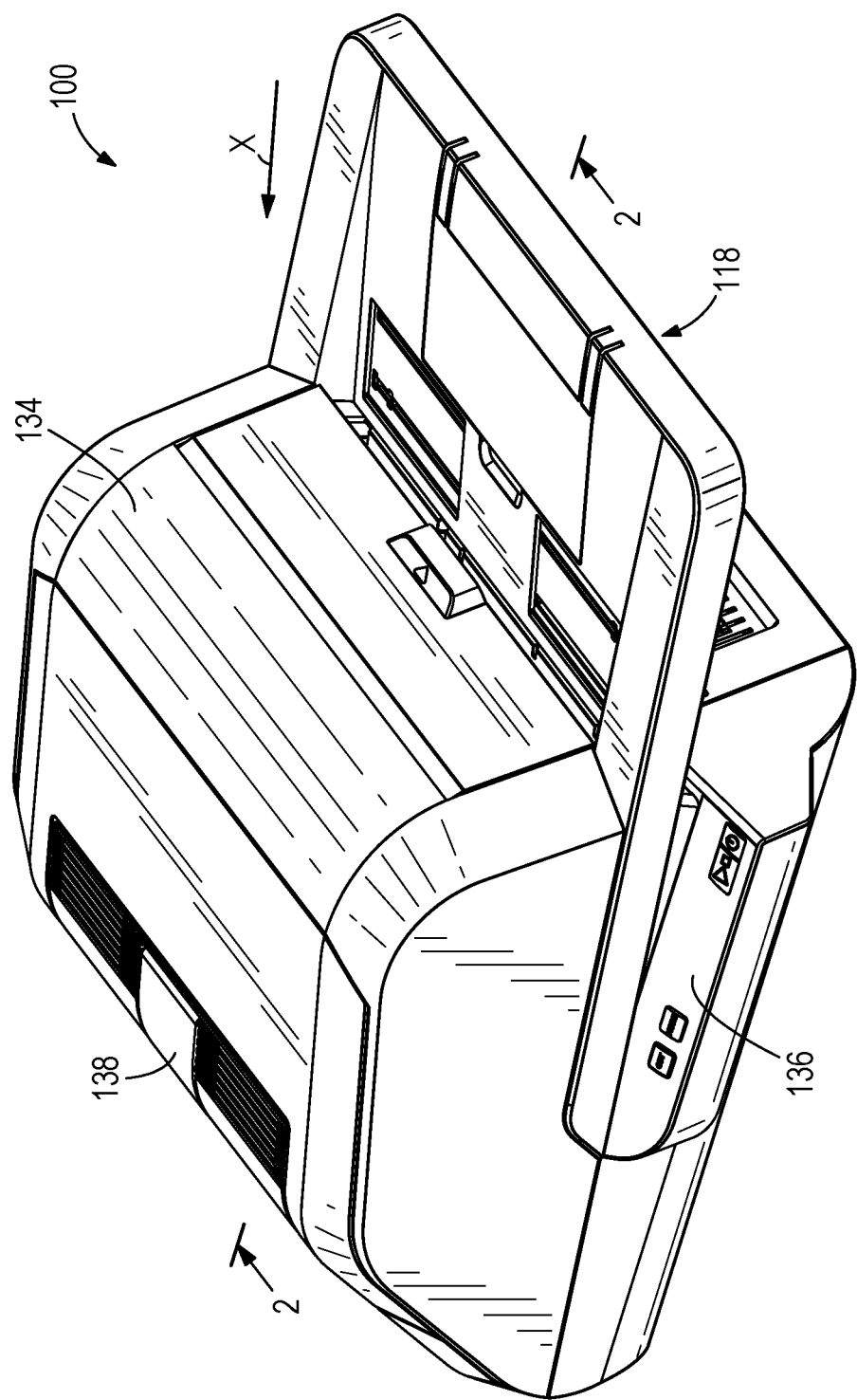
FIG. 1 is a perspective view of a laminating system including a laminating machine for use with a cartridge system of the present disclosure.
Figure 2:
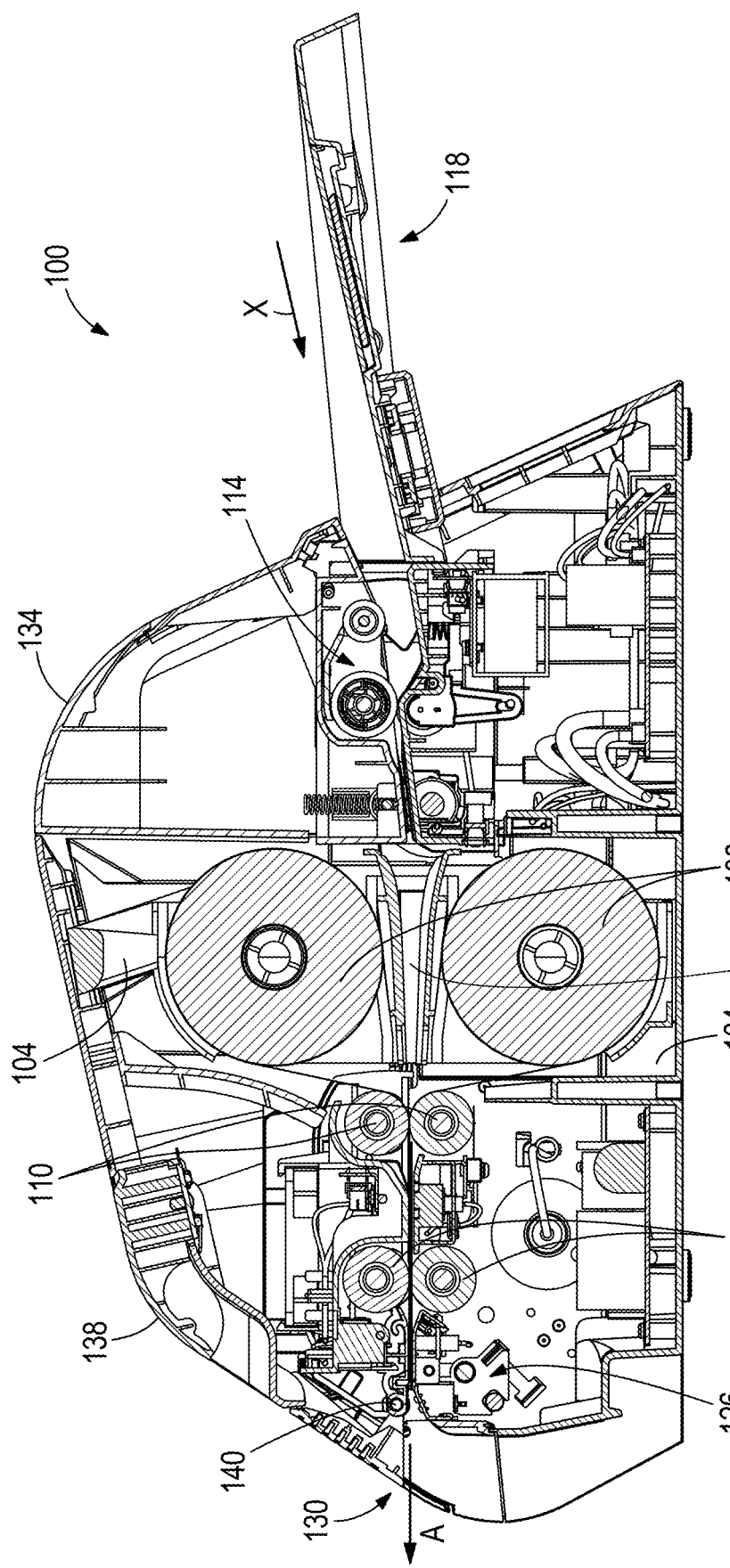
FIG. 2 is a cross-section view of the laminating system, taken along line 2-2 of FIG. 1.

FIGS. 1 and 2 illustrate a laminating system comprising a laminating machine 100 and a removable laminating film cassette or cartridge system or assembly 200 that fits into a receptacle 104 of the machine 100. The cartridge assembly 200 can be keyed to the receptacle 104 of the machine 100 to allow fitment in only one prescribed orientation. In particular, the cartridge assembly 200 includes a machine interface adapted for insertion into the laminating machine 100, the interface including a plurality of asymmetrical surfaces 106 that contact corresponding surfaces of the machine receptacle 104. The cartridge assembly 200, which is described in further detail below, contains two parallel, spaced rotatable rolls 206 of continuous adhesive-coated laminating film.

The film webs on the rolls 206 include adhesive on the sides facing each other, and the adhesive may be heat-sensitive for activation within the machine 100. The machine 100 thus includes a set of heat rollers 110 at a position downstream of the cartridge receptacle 104 operable to generate heat configured to activate the adhesive. The heat rollers 110 can be supplied with electrical energy in a variable manner, by a controller, in order to apply an appropriate amount of heat to the film webs and the adhesive thereof as the machine 100 conducts and advances the film webs and any article(s) therein through the machine 100. The articles can be any article suitable for laminating, including but not limited to paper, cards, or photos. Advancement of articles through the machine 100 is handled by an auto-feeder 114 that feeds articles from an inlet feed tray 118 to the film webs and by a set of pull rollers 122 downstream of the heat rollers 110 that pull the film-laminated article toward a cutter assembly 126 and an outlet chute 130. References herein to upstream and downstream directions are made in reference to the direction of movement of the article through the machine 100 from side to side along an x-axis. A y-axis is defined as the other planar article direction, extending front-to-back along the machine 100 perpendicular to the x-axis.

A housing 134 of the machine 100 encloses the cartridge 200 along with functional elements of the machine 100, including the auto-feeder 114, the heat and pull rollers 110, 122, and the cutter assembly 126. The housing 134 also encloses electronics, such as a controller (e.g., processor and memory for storing data and executable instructions). As shown in FIG. 1, a control panel 136 providing a user interface can be provided on an outside surface of the housing 134. The user interface can include physical inputs (e.g., switches, buttons, etc.) and optionally an electronic display. In some constructions, the user interface can be provided wholly or in part by a touch screen interface. The housing 134 can further include a door 138 for accessing the cartridge 200, for example, for removal/replacement thereof. The door 138 can be pivotally mounted, although additional linkages and mechanisms are optional. The illustrated door 138 is supported at a pivot 140, which is a fixed pivot on the housing 134. The door 138 also supports upper ones of the heat and pull rollers 110, 122 such that upward movement of the door 138 gaps these upper rollers apart from their matching lower rollers for easy and automatic loading of the leading end tail of the film webs therebetween. The heat and pull rollers 110, 122 re-close to engage or pinch the leading end tail of the film webs upon closure of the door 138.

Figure 3:
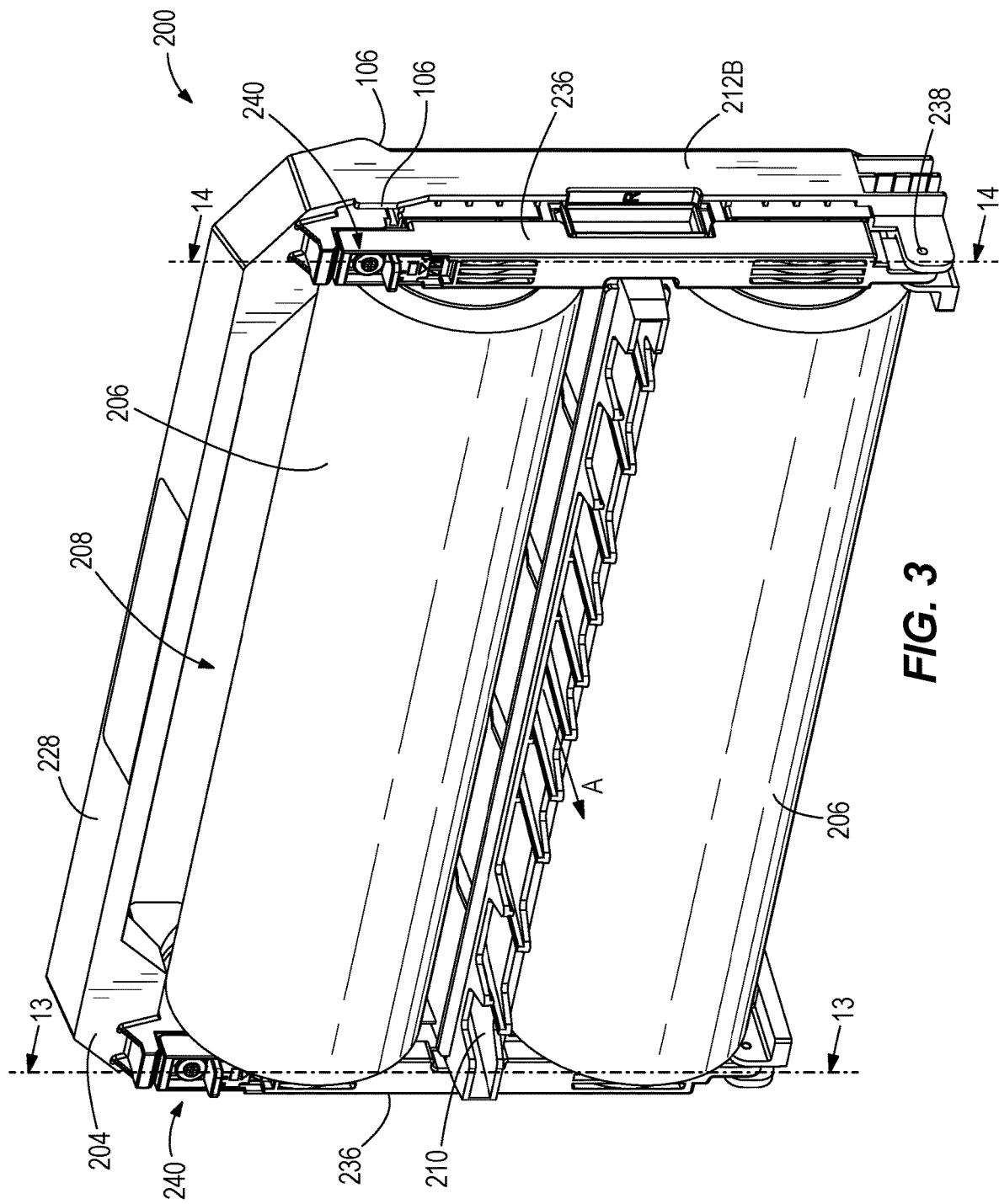
FIG. 3 is a perspective view of the cartridge system, separate from the laminating machine.
Figure 4:
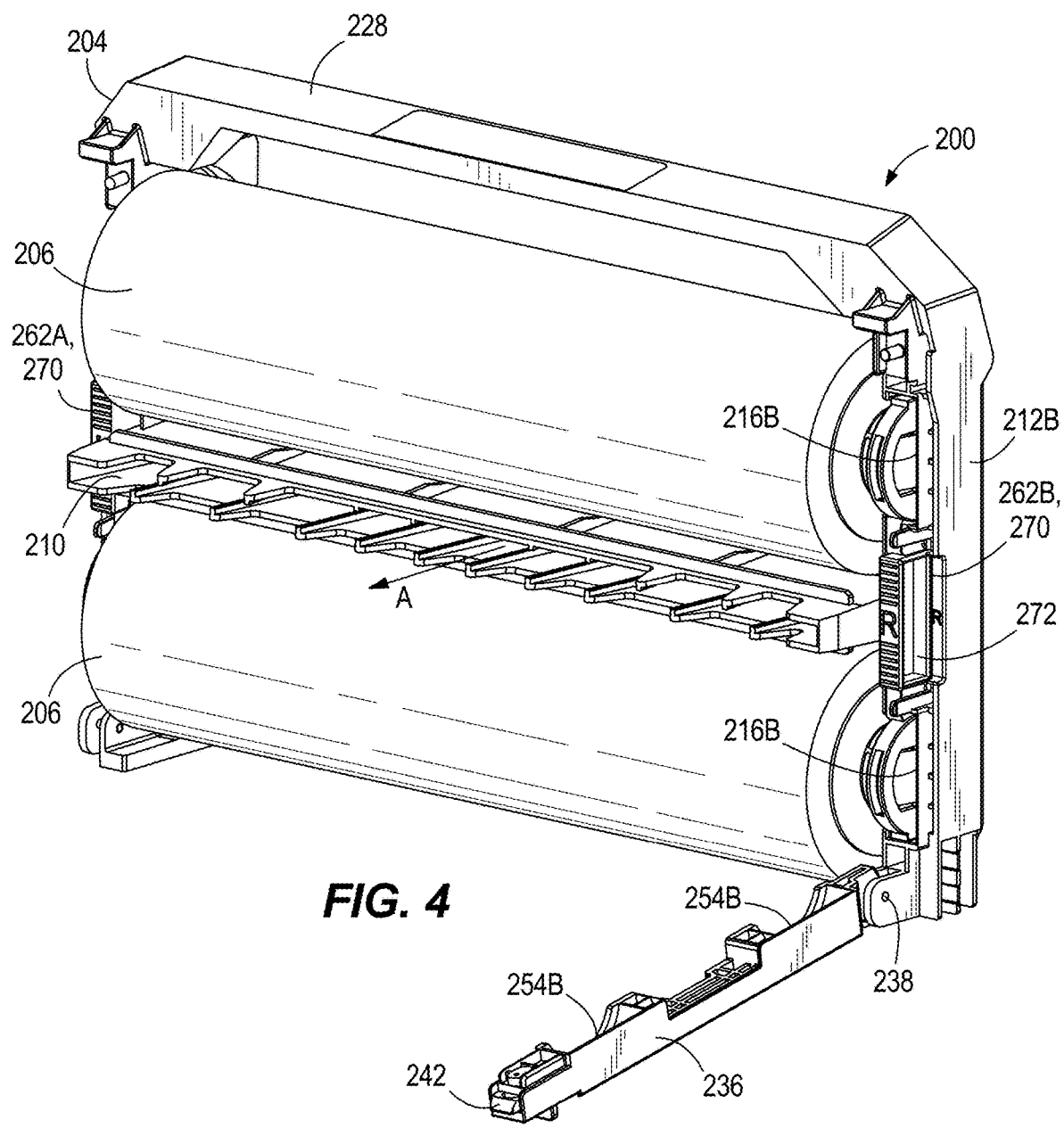
FIG. 4 is a perspective view of the cartridge system of FIG. 3 in which a first closure on the cartridge is moved to an open position for releasing a film refill from the cartridge.
Figure 5:
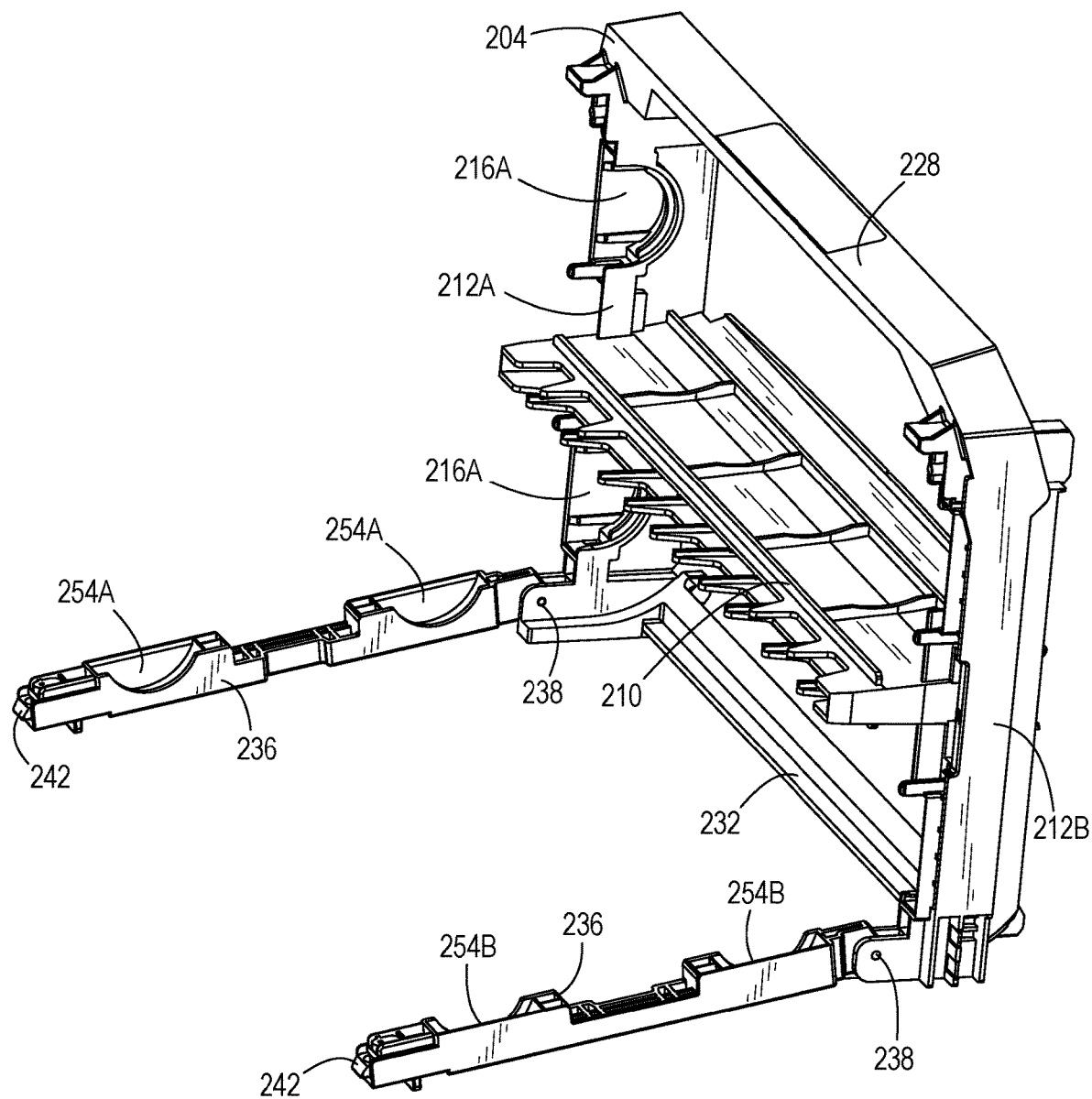
FIG. 5 is perspective view of the cartridge system of FIG. 3 in which first and second closures are open and the film refill is removed from the cartridge.
Figure 13:
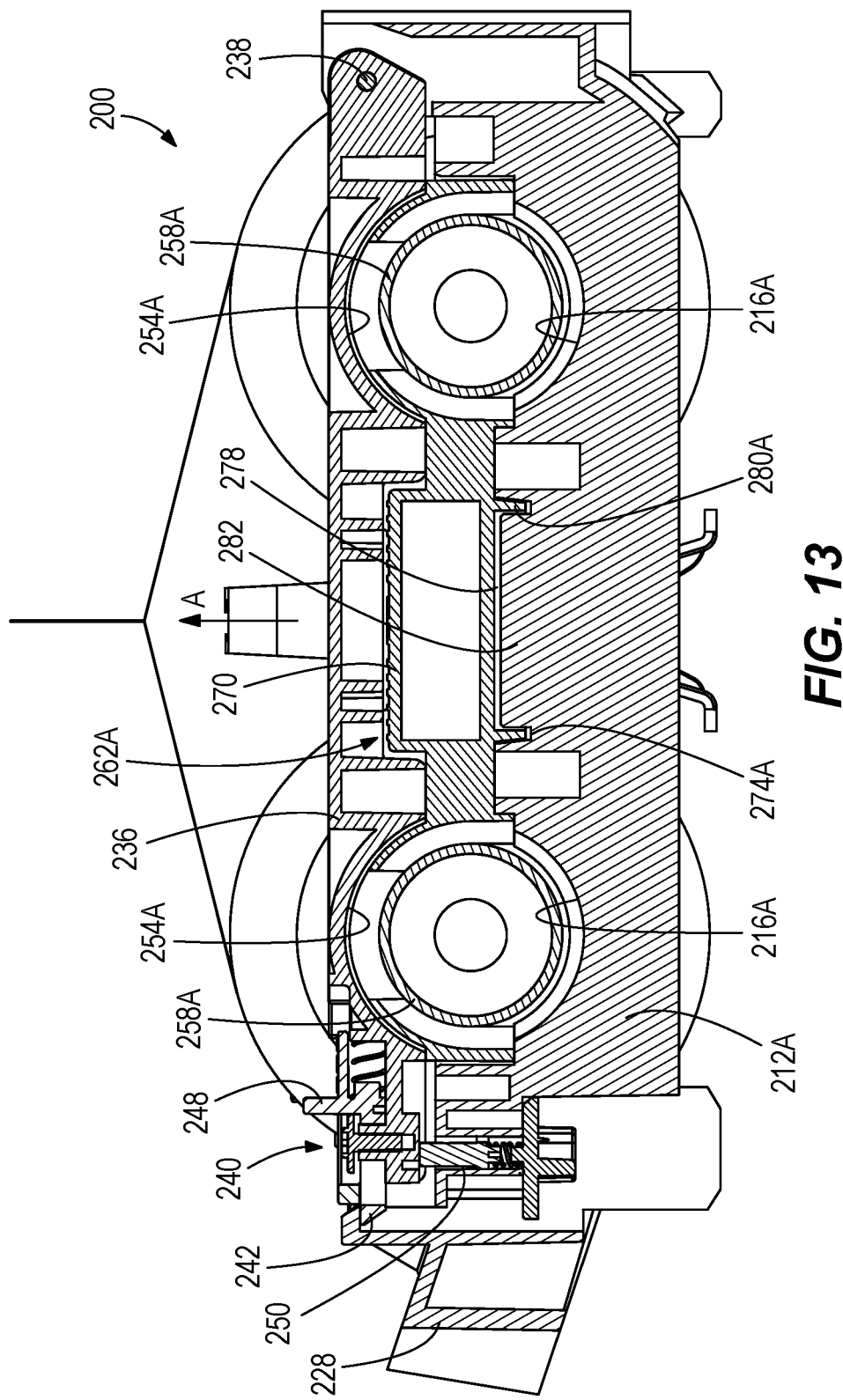
FIG. 13 is a cross-section view of the loaded cartridge, taken along line 13-13 of FIG. 3.
Figure 14:
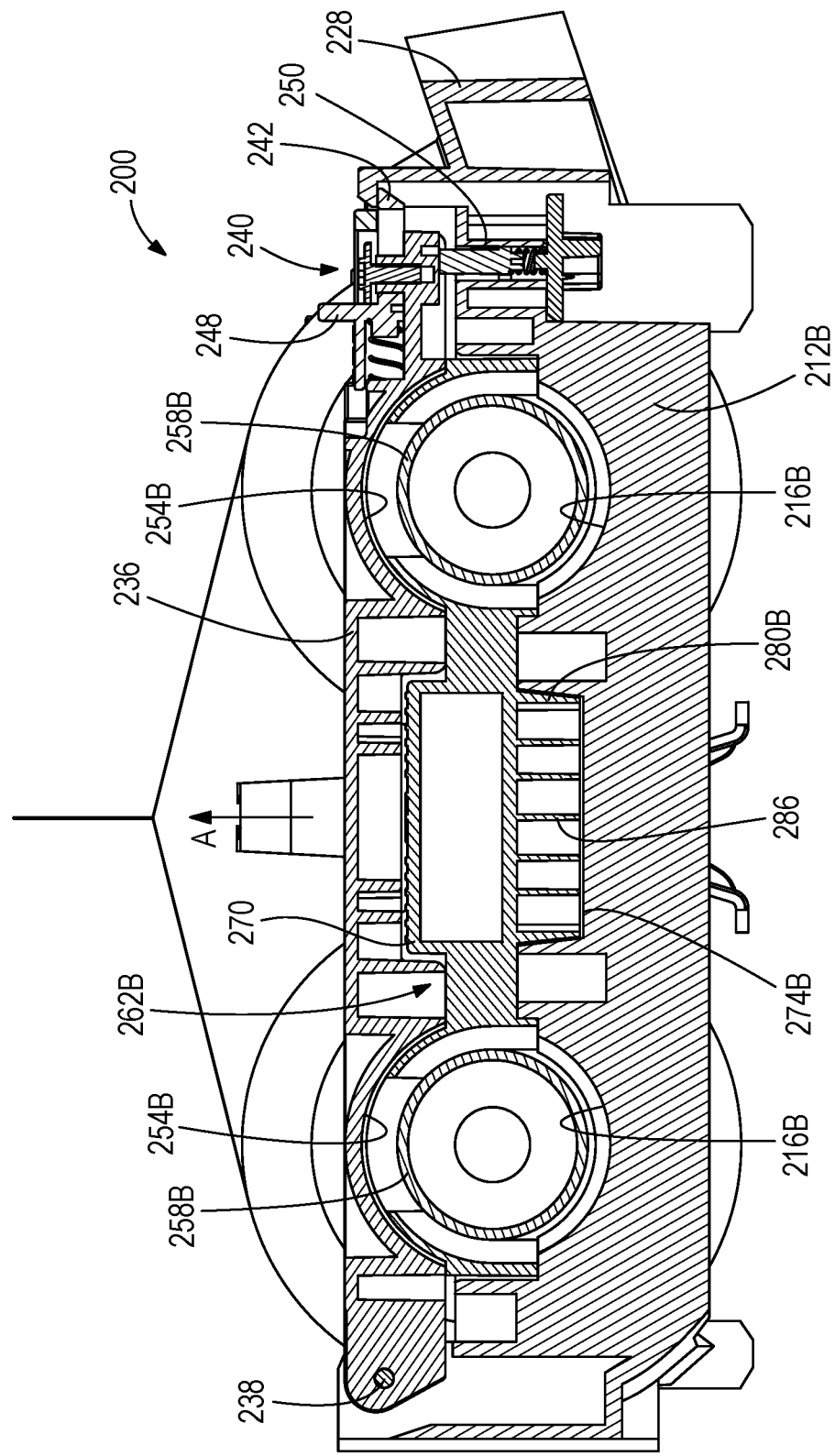
FIG. 14 is a cross-section view of the loaded cartridge, taken along line 14-14 of FIG. 3.

FIGS. 3 and 4 illustrate the cartridge assembly 200 in further detail. The cartridge assembly 200 according to the illustrated embodiment is a dual roll laminating film cartridge assembly that includes both a cartridge skeleton or frame 204 and a separate laminating film refill 208. The refill 208 is separable as a unit from the cartridge frame 204, thus rendering the cartridge frame 204 a reusable cartridge portion of the cartridge assembly 200 that is reloadable with new refills 208 for repeat use in the laminating machine 100. The cartridge frame 204 alone, without the refill 208, can establish the interface with the laminating machine 100. Rather than disposing of the entire cartridge 200 and replacing with another like cartridge 200 when the film rolls 206 are used up, the spent refill 208 can be removed and the cartridge frame 204 re-loaded with a new refill 208. In other words, the cartridge assembly 200 is convertible between loaded and unloaded (empty) states by association of the refill 208 with the cartridge frame 204, or disassociation therefrom as the case may be. The cartridge frame 204 includes a first end 212A and a second opposite end 212B, e.g., first and second end plates or end columns. The first cartridge frame end 212A includes a first pair of receptacles 216A (FIGS. 5 and 14), while the second cartridge frame end 212B includes a second pair of receptacles 216B (FIG. 13). The first pair of receptacles 216A can be discrete receptacle areas or two spaced receptacle areas of a common receptacle. Likewise, the second pair of receptacles 216B can be discrete receptacle areas or two spaced receptacle areas of a common receptacle.

A bridge 210 extends between the first and second cartridge frame ends 212A, 212B to define a central article chute 224 for the reception of articles and guidance into the space between the two film webs to be laminated. The chute 224 can bound the flat article on one or both sides. The bridge 210 is situated at an intermediate position between the two film rolls 206 and thus connects to the respective cartridge frame ends 212A, 212B at central portions thereof. The bridge 210 fortifies the structure of the cartridge frame 204, e.g., increasing its torsional rigidity. The bridge 210 can be formed separately from the cartridge frame ends 212A, 212B and engageable therewith, or formed integrally (e.g., the bridge 210 being molded together with the cartridge frame ends 212A, 212B as one monolithic cartridge frame 204). In addition to the bridge 210, and running parallel to the bridge 210, are upper and lower cross-members 228, 232, each of which spans between the cartridge frame ends 212A, 212B. Like the bridge 210, the cross-members 228, 232 can be integral with the cartridge frame ends 212A, 212B or separately formed and secured therewith. The upper cross-member 228 forms a handle at the uppermost portion of the cartridge assembly 200, presented for grasping and removing the cartridge assembly 200 from the machine receptacle 104. Although not illustrated in all of the figures, the leading ends of the webs from the two rolls 206 can be pre-connected with a factory bond, e.g., heat seal, as opposed to being provided with loose ends, thus simplifying the setup of the laminating machine 100 when loading the cartridge assembly 200. The leading ends extend to one side of the refill 208, defining an advancing direction A (FIGS. 2-4), consistent with use in the machine 100. The opposite side of the refill 208 constitutes a cartridge-facing side, the refill 208 being assembled with the cartridge frame 204 in this direction, opposite the advancing direction A.

Figure 12:
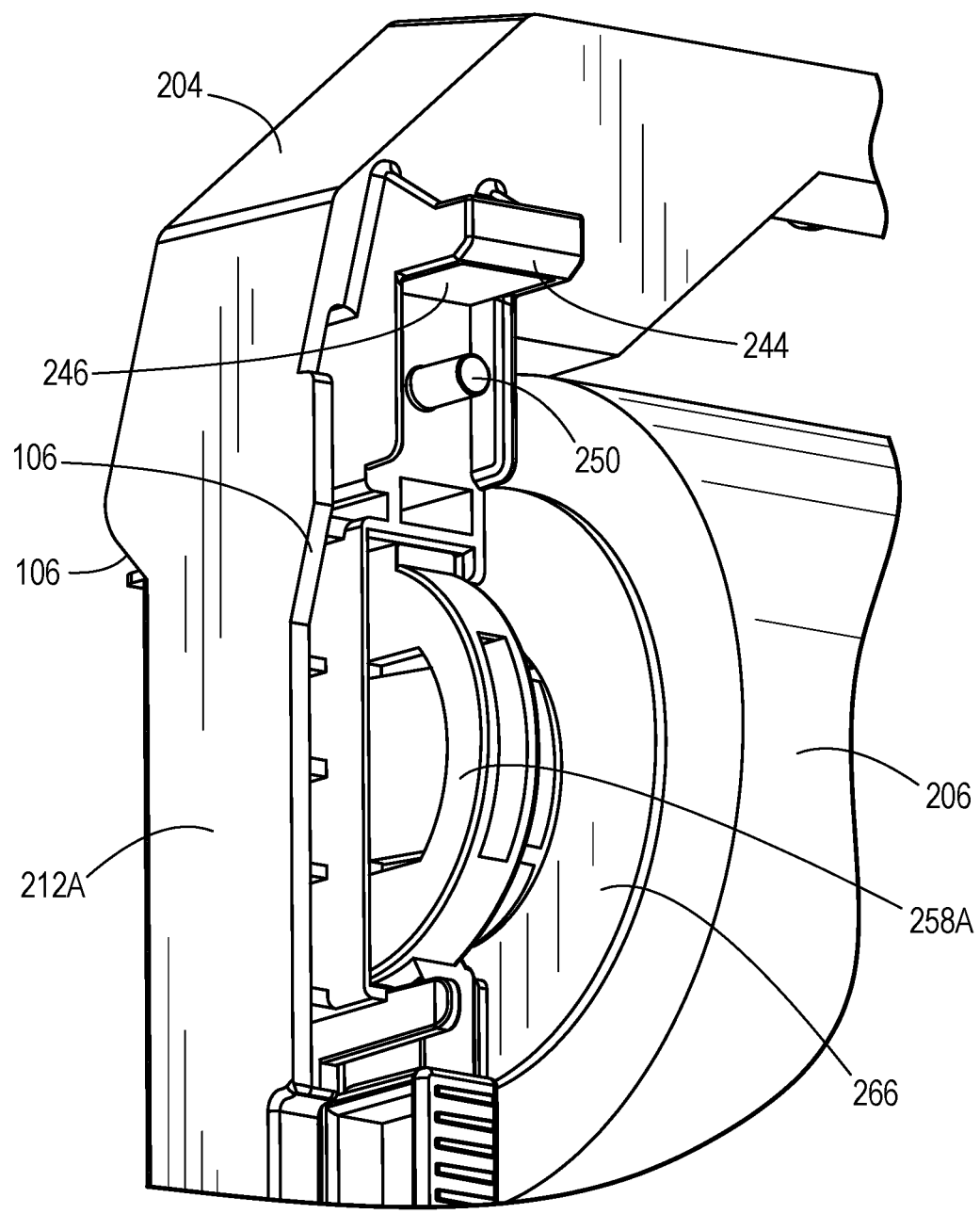
FIG. 12 is a detail perspective view of a latch portion of the cartridge to which the closure mates.

In order to selectively retain and release the refill 208 to and from the cartridge frame 204, the cartridge frame 204 is provided with at least one closure 236 movable between an open position and a closed position with respect to a body portion of the cartridge frame 204 including the cartridge frame ends 212A, 212B. This is one example of rendering the refill 208 with a latched state and being selectively releasable to an unlatched state. As illustrated, there are separate closures 236 provided along each cartridge frame end 212A, 212B. Each closure 236 is hinged to the remainder of the cartridge frame 204 by a respective hinge pin 238, although the closures 236 can be coupled in a variety of other manners, which may or may not define a fixed pivot on the cartridge frame 204. In some constructions, a closure may be fully releasable from the cartridge frame 204 when opened. Opposite the hinged end, each closure 236 defines part of a latch mechanism 240. For example, the latch mechanism 240 as shown in detail in FIG. 12 can include a spring-biased latch bolt 242 that mates with a striker surface 244 and an adjacent latch bolt receptacle 246 on the body portion of the cartridge frame 204. The latch bolt 242 includes a lever or handle 248 for manipulating the latch mechanism 240 for release. A spring-biased ejector pin 250 can be provided on one of the closure 236 or the body portion of the cartridge frame 204 (e.g., adjacent the latch mechanism 240) for urging the closure 236 out of the closed position when the latch mechanism 240 is released. The closures 236 are configured to cover the respective first and second sets of receptacles 216A, 216B defined in the first and second cartridge frame ends 212A, 212B. Moreover, the closures 236 can be formed with receptacles 254A, 254B configured to cooperate with the respective sets of receptacles 216A, 216B to accommodate the refill 208 and retain it in a prescribed position in the cartridge frame 204. Although shown as separately formed and separately openable/closable, the closures 236 may be interconnected and/or operable to open/close by a shared latch mechanism. Alternately, the refill 208 may be directly latched and unlatched to and from the cartridge frame 204, e.g., by incorporation of a latch mechanism therewith, or a latch mechanism on the cartridge frame 204 configured to operate on the refill 208. This represents yet another means for transitioning the refill 208 selectively between latched and unlatched states.

Figure 10:
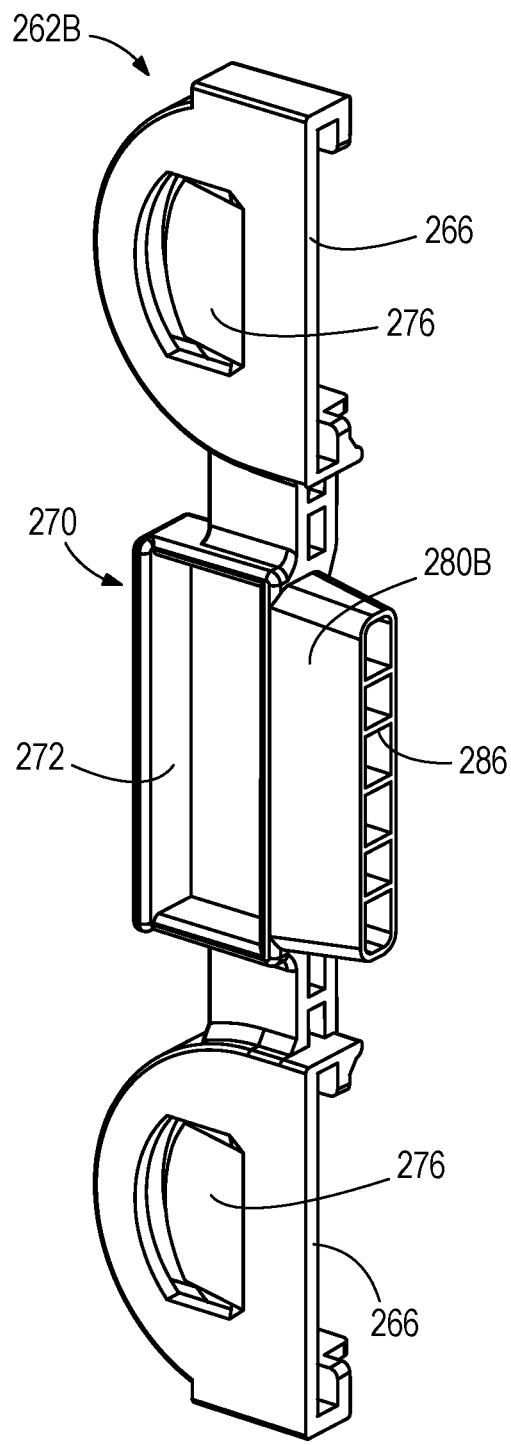
FIG. 10 is an outboard perspective view of a second one of the refill end connectors.
Figure 11:
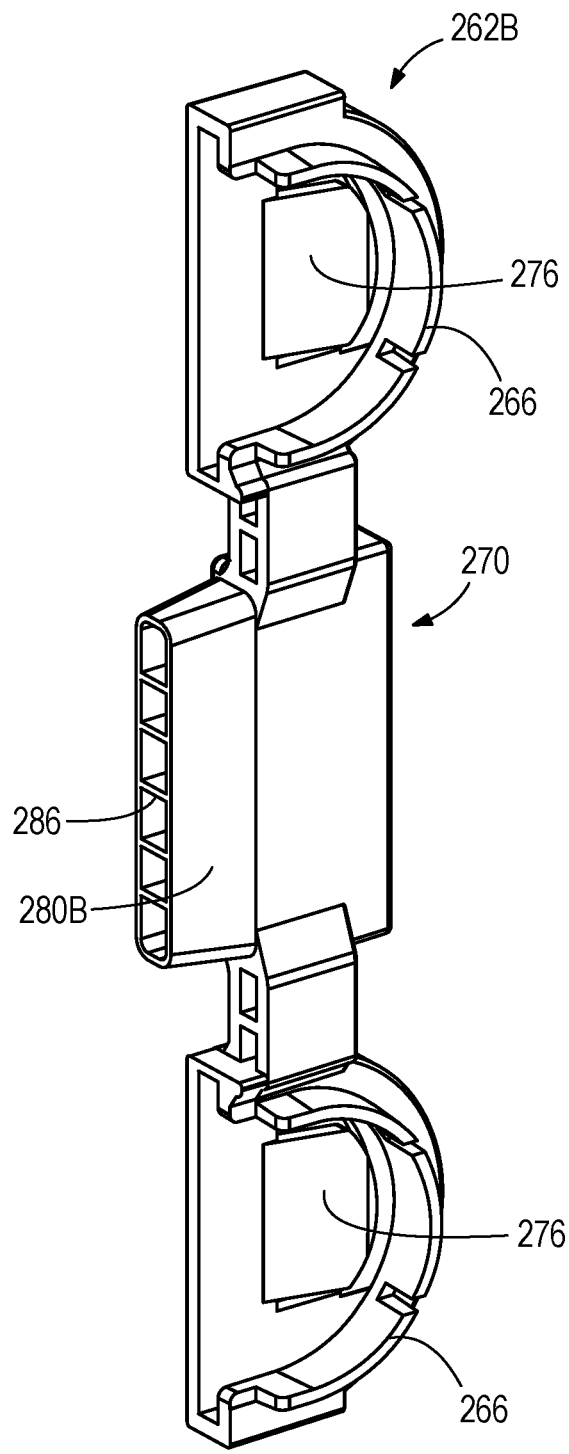
FIG. 11 is inboard perspective view of the second refill end connector.

With respect to the refill 208, each of the first and second rolls 206 includes a spool 258 about which the laminating film is wound, defining respective axes A1, A2. At opposite axial ends, each spool has a first spool end 258A and a second spool end 258B. Each spool end 258A, 258B can be provided in the form of an end cap engaged with a central portion of the spool 258. In other constructions, the spool ends 258A, 258B constitute the entire spool, there being no additional central portion extending through the roll 206. The first spool ends 258A of the respective film rolls 206 are coupled together by a first connector 262A (FIGS. 8 and 9), and the second spool ends 258B of the respective film rolls 206 are coupled together by a second connector 262B (FIGS. 10 and 11). The connectors 262A, 262B set the two rolls 206 at a predefined gap distance D, which may be measured center-to-center between the respective axes A1, A2. Thus, the gap distance D is set prior to the film rolls 206 being introduced to the cartridge frame 204. The connectors 262A, 262B are also responsible for providing clamping force onto the respective spools 258 that keeps the film webs taut during operation in the machine 100. Maintaining the predetermined amount of film web tension is accomplished by spool end retainers or covers 266 (two per connector 262A, 262B) that form tight-fit plain bearings on journal portions of the spool ends 258A or the spool ends 258B, respectively. Alternately or in addition, the spool end retainers 266 can be configured to clamp axially on the faces of flanges of the spool ends 258A or the spool ends 258B to create resistance in dispensing the laminating film from the rolls 206. As such, any wear that occurs in the tight-fit surfaces between the spool end retainers 266 and the spool ends 258A, 258B has no detrimental effect on the reusable cartridge frame 204 since the spool ends 258A, 258B and the connectors 262A, 262B are, along with the rolls 206 of the refill 208, disposable pieces divorced from the cartridge frame 204. Stationary wear surfaces for directly supporting the movable rolls 206 are only provided by the disposable refill 208, and not the reusable cartridge frame 204. Thus, the tension is reset to consistent factory specifications each time a new refill 208 is loaded to the cartridge frame 204, and the tension is set and maintained whether or not the refill 208 is assembled with the cartridge frame 204.

Figure 6:
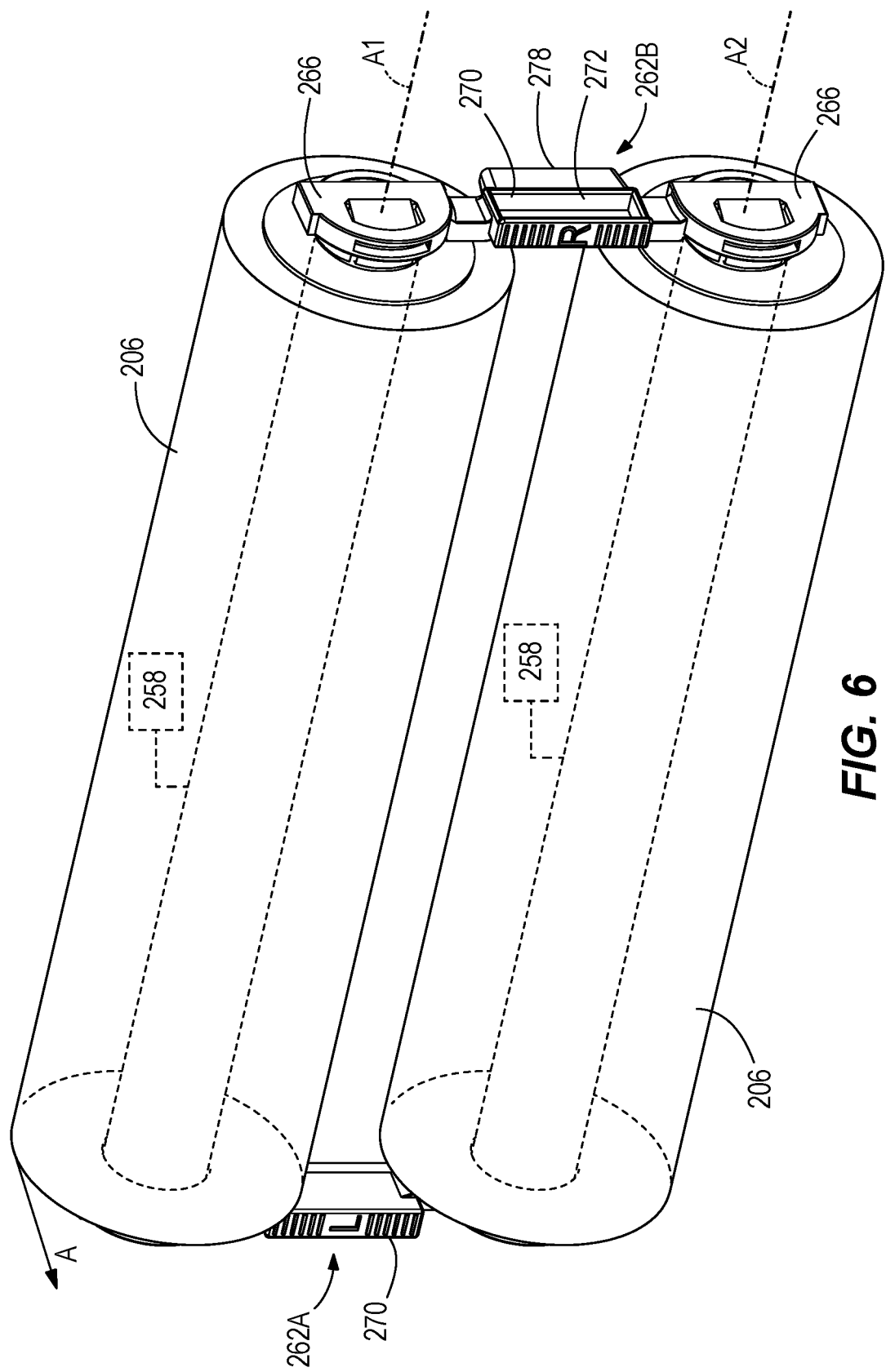
FIG. 6 is a perspective view of the cartridge refill including two film rolls and two end connectors, the refill shown removed from the cartridge.
Figure 7:
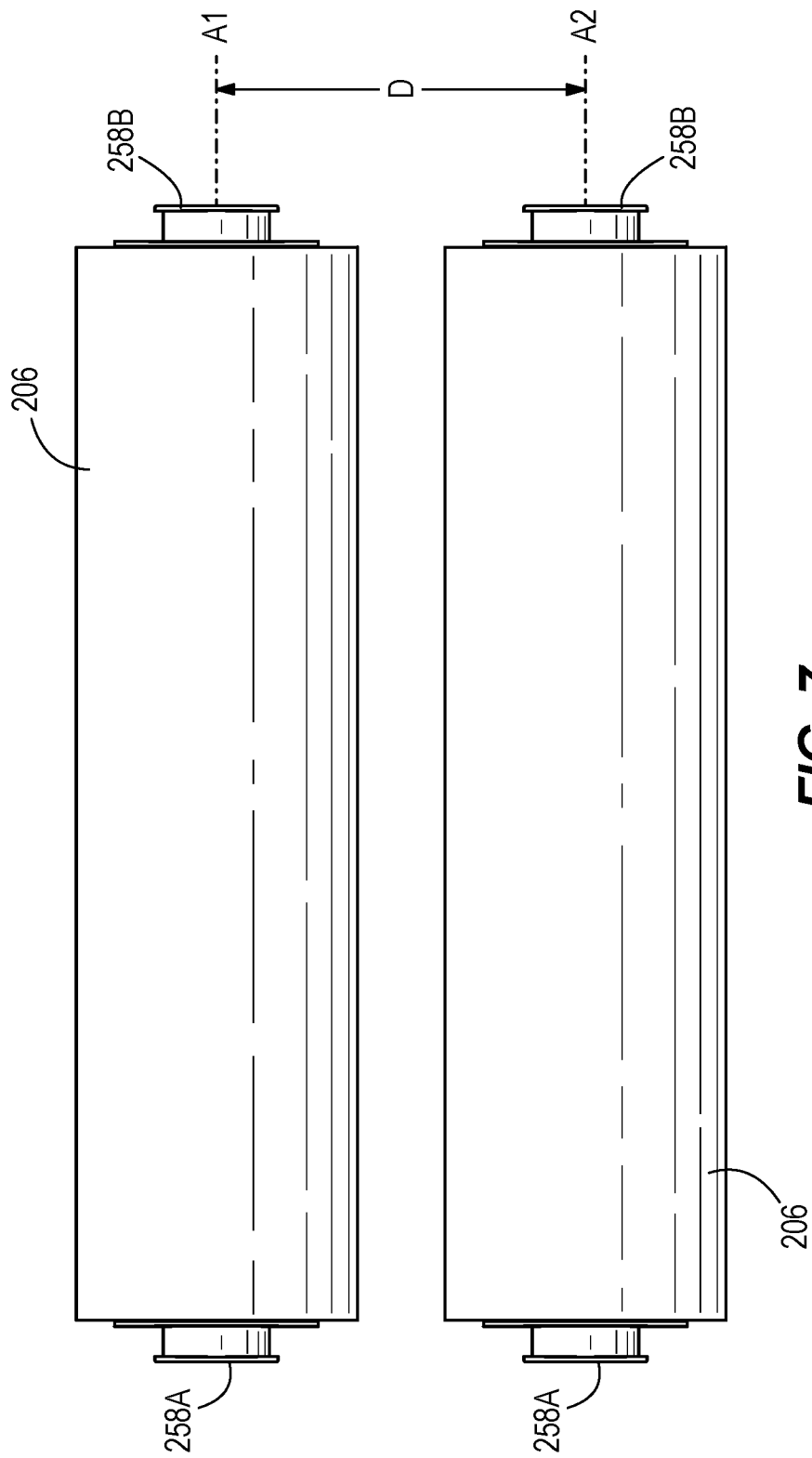
FIG. 7 is a front view of the two film rolls of the refill with the two end connectors removed.

Between the spool end covers 266, each connector 262A, 262B includes a central portion 270 that may serve as a handle for the user when loading/unloading the cartridge frame 204 with the refill 208. The central portion 270 on each connector 262A, 262B can be formed with an ergonomic recess 272 (FIGS. 8 and 10) or finger hold for enhancing the handleability. The recesses 272 can be formed on the respective outboard sides. With or without the recesses 272, the central portion 270 as a whole may constitute a grip, such that the user may conveniently grasp, move, and orient the refill 208 by gripping the central portions 270 of the respective connectors 262A, 262B. One or both central portions 270 can include indicia of directional instruction to be observed by the user when loading the cartridge 200. For example, the first connector 262A is provided with an "L" for left, and the second connector 262B is provided with an "R" for right as shown in FIG. 6. In other embodiments, the indicia may take other forms. Ribbing may be added to the central portions 270, e.g., in the area adjacent the indicia, for enhanced grip. As described in further detail below, additional means can be provided for inhibiting or preventing improperly loading the cartridge 200 with the refill 208.

Figure 8:
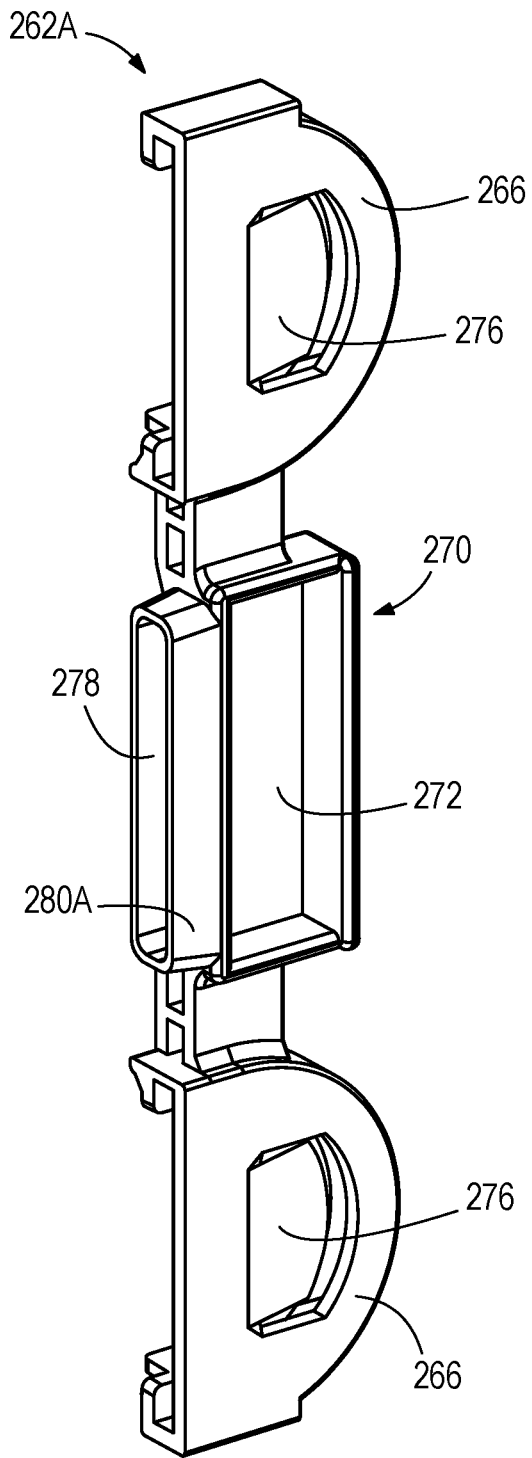
FIG. 8 is an outboard perspective view of a first one of the refill end connectors.
Figure 9:
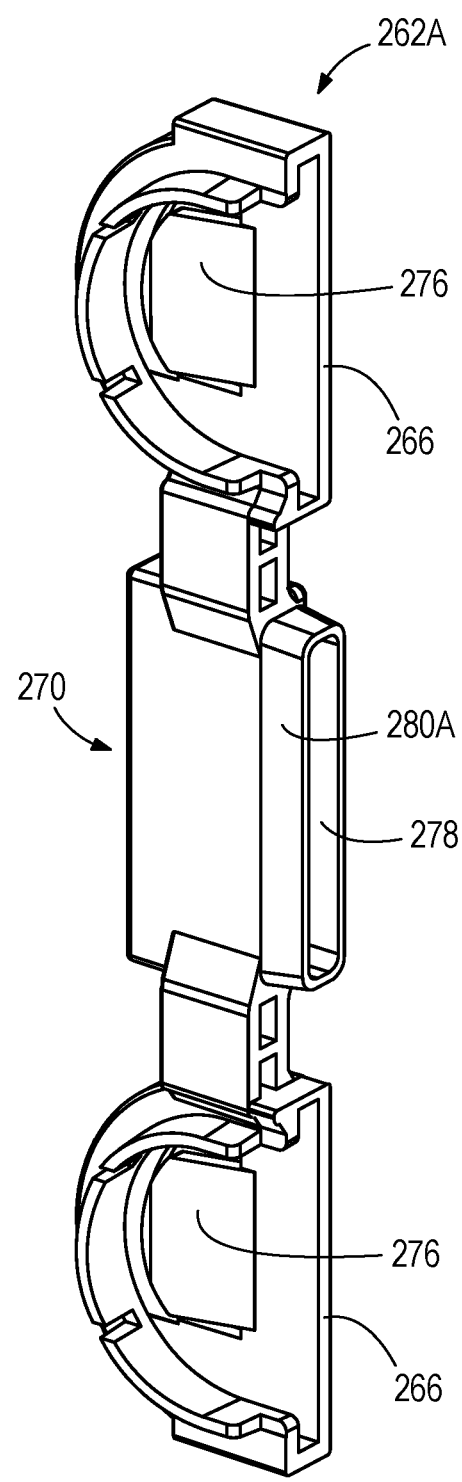
FIG. 9 is an inboard perspective view of the first refill end connector.

As shown in FIGS. 8 and 9, the first connector 262A is formed as a single piece, for example one monolithic molded component. Similarly, the second connector 262B can be formed as a single piece, for example one monolithic molded component, as shown in FIGS. 10 and 11. Alternately, one or both of the connectors 262A, 262B can be provided as a multi-piece assembly or a component including a flexible living hinge. For example, a connector can have two pieces or portions that snap together in order to capture the respective pair of spool ends 258A (or 258B) of the two film rolls 206. In the illustrated embodiment, each spool end cover 266 of each connector 262A, 262B includes a latch 276 for engaging and retaining the respective spool ends 258A, 258B. The latches 276 can be configured to positively retain the respective spool end 258A, 258B automatically upon sliding the spool end into the spool end cover 266. As illustrated, the latches 276 are cantilevered flaps depending from the surrounding material without separate release mechanisms for releasing the latches 276 as the user need not separate the film rolls 206 from each other prior to disposal. Elastic deflection at the connected end of each latch 276 enables movement and return of the free end of the latch 276 for snapping into place at the time of assembly.

To load an empty cartridge, provided by the cartridge frame 204 and the closures 236 alone, the refill 208 is placed into the cartridge frame 204 (with the closures 236 in the open positions). In doing so, the spool ends 258A, 258B and the respective spool end covers 266 of the connectors 262A, 262B are received by the respective first and second pairs of receptacles 216A, 216B. Assuming the first side of the refill 208 and the first side of the cartridge frame 204 are properly oriented with each other, the refill 208 will seat properly into the receptacles 216A, 216B, and the refill 208 can be secured in place by moving the closures 236 to their closed positions, including latching the latch mechanisms 240. When seating a properly oriented refill 208 to the cartridge frame 204, portions of the first and second connectors 262A, 262B establish unique interfaces with the cartridge frame 204, in particular a first accommodating portion for the central portion 270 of the first connector 262A situated between the first receptacles 216A and a second accommodating portion for the central portion 270 of the second connector 262B situated between the second receptacles 216B. Due to dissimilar shaping amongst the unique interfaces, the refill 208 is keyed and can only be installed properly to the cartridge frame 204, upside-down or backward installations being physically blocked by lack of complementary fitting parts. By keying the refill 208, one or both of the closures 236 are prevented from closing when the refill is improperly positioned, e.g., having the first and second ends switched with respect to the first and second ends of the cartridge frame 204. They keying may be used to guarantee that a preselected one of the rolls 206 (e.g., the roll manufactured with slightly shorter total film length than the other) is positioned to be monitored by the machine 100 (e.g., toward the bottom, away from the upper cross-member 228 and under the bridge 210). Thus, the shorter of the two rolls 206 is monitored by a film level sensor and/or end-of-roll sensor of the machine 100—see for example the sensors disclosed in U.S. Patent Application Publication No. 2020/0130341, the entire contents of which are incorporated by reference herein. Because the shorter of the film rolls 206 is guaranteed to be the monitored film roll 206, there is no instance where the film supply runs out unexpectedly. This is one example, and it is noted that the refill 208 can be keyed for this and/or other reasons. It is further conceived that the refill 208 may be designed in other constructions to be un-keyed and able to be loaded properly to the cartridge frame 204 in multiple different orientations.

Although numerous types of key interfaces can be provided for keying the refill 208, some constructions utilize male-female interfaces at the central portions 270 of both connectors 262A, 262B, with an extra or secondary male-female interface formed between the cartridge frame 204 and at least one of the connectors 262A, 262B (e.g., at the central portion 270 of the first connector 262A according to the illustrated construction). As shown in FIG. 13, the cartridge frame 204, particularly the first end 212A, includes a receptacle 274A. The properly oriented refill 208 places a male projection 280A of the first connector 262A (within the central portion 270 thereof) into the receptacle 274A formed in the first end 212A of the cartridge frame 204. As can be appreciated from the drawings, the male projection 280A extends from the central connector portion 270 in a direction perpendicular to the central axes A1, A2 of the first and second rolls 206. In addition to the primary male-female interface provided by the male projection 280A being received by the receptacle 274A, the secondary male-female interface is directly integrated or incorporated within the receptacle 274A and the male projection 280A providing the primary male-female interface. In particular, FIG. 13 illustrates that a receptacle 278 is formed within the male projection 280A of the first connector 262A. In other words, the male projection 280A can be partially or completely hollow to form an opening facing into the receptacle 274A of the cartridge frame 204. Furthermore, within the receptacle 274A of the cartridge frame 204, a secondary male projection 282 is provided by the cartridge frame 204—the secondary male projection 282 configured to make a complementary fit with the receptacle 278 formed in the first connector 262A. In other words, the primary and secondary male-female interfaces provide for a portion of the first connector 262A to be received by the cartridge frame 204 while at the same time a portion of the cartridge frame 204 is received by the first connector 262A. In other constructions, keying via a secondary male-female interface can provide both male projections on one of the parts and both of the female receptacles on the other part. In yet other constructions, keying can be provided by a single male-female interface.

On the opposite side (FIG. 14), the second connector 262B has (within the central portion 270 thereof) a male projection 280B extending therefrom and configured to make a complementary fit with the receptacle 274B formed at the second end 212B of the cartridge frame 204. However, the receptacle 274B may be formed without a male projection therein. Further, the male projection 280B is partially or fully closed on the side facing into the receptacle 274B. Particularly, there can be one or more physical obstructions 286 within the male projection 280B, and the obstructions 286 are configured to prevent the male projection 280B of the second connector 262B from seating into the receptacle 274A of the first end 212A of the cartridge frame 204 (an improper orientation). Physical obstruction of just one of the connectors 262A, 262B with the non-corresponding one of the cartridge frame ends 212A, 212B may be sufficient to provide the desired keying feature and prevent the user from mis-assembling the refill 208. For example, physical obstruction on just one side may render the cartridge frame 204 unable to be fully closed around the refill 208 and unable to seat fully or properly into the laminating machine 100. However, it is possible to further configure the keying feature such that assembly of the first connector 262A with the receptacle 274B of the second end 212B is also prevented, e.g., by an outer perimeter of the male projection 280A being enlarged compared to the receptacle 274B, such that the physical obstruction occurs on both sides upon a mis-assembly attempt.

By way of the keying provided by the connector central portions 270 and the corresponding receptacles 274A, 274B, the spool ends 258A, 258B are prevented from being received into the opposite or incorrect receptacles 216A, 216B upon an incorrect assembly attempt for the refill 208 with respect to the cartridge frame 204. The construction illustrated results in the first and second connectors 262A, 262B being not only uniquely shaped from each other, but asymmetrical as well. For example, the connectors 262A, 262B, especially the central portions 270 and the male projections 280A, 280B thereof, are not symmetrical across a central plane that bisects each of the film rolls 206. The same can be said for the receptacles 274A, 274B corresponding to and interfacing with the two male projections 280A, 280B. In other constructions, keyed male-female interfaces may be defined in other ways, e.g., by other shapes and/or having the male and female portions reversed.

According to the disclosure, the cartridge assembly 200 is reloadable with the refills 208, which are designed with minimal amounts of material (e.g., plastic) to reduce waste associated with the use of the laminating machine 100. The exchange of a spent refill 208 for a new refill 208 does not require manipulation or removal of fasteners and is completely tool-less and capable of being carried out in minimal process steps by human hands. By simplifying the refill 208 and reducing the amount of material therein, since the cartridge frame 204 is responsible for the machine interface and overall strength of the cartridge assembly 200, the refill 208 can also be produced more cost effectively.

Various features and advantages of the disclosure are set forth in the following claims.

What is claimed is:

1. A dual roll laminating film cartridge refill for a reusable cartridge loadable in a laminating machine, the refill comprising:
   a first roll of continuous adhesive-coated translucent laminating film having a first axial end and a second axial end;
   a second roll of continuous adhesive-coated translucent laminating film having a first axial end and a second axial end;
   a first connector coupling the first axial ends of the first and second rolls at a predefined gap distance; and
   a second connector independent from and spaced from the first connector, the second connector coupling the second axial ends of the first and second rolls at the predefined gap distance,
   wherein the first and second connectors are uniquely shaped and asymmetrical across a central plane that bisects each of the first and second rolls to provide a keyed interface that limits insertion of the dual roll laminating film cartridge refill into the reusable cartridge in one prescribed orientation.

2. The dual roll laminating film cartridge refill of claim 1, wherein the first connector includes respective spool end covers coupling respective first spool ends of the first and second rolls, and wherein the second connector includes respective spool end covers coupling respective second spool ends of the first and second rolls.

3. The dual roll laminating film cartridge refill of claim 2, wherein, between the spool end covers, each of the first and second connectors includes a central portion including an outboard-facing finger hold recess to provide a grip for handling the dual roll laminating film cartridge refill.

4. The dual roll laminating film cartridge refill of claim 1, wherein each of the first and second connectors includes a central portion extending between the first and second rolls, and wherein unique shaping of the central portions of the first and second connectors on cartridge-facing sides thereof provide the keyed interface.

5. The dual roll laminating film cartridge refill of claim 4, wherein the unique shaping includes respective male projections of the first and second connectors, only one of which is open to the cartridge-facing sides for accepting a portion of the reusable cartridge therein.

6. The dual roll laminating film cartridge refill of claim 5, wherein the respective male projections extend in a direction perpendicular to central axes of the first and second rolls.

7. The dual roll laminating film cartridge refill of claim 4, wherein the cartridge-facing sides are opposite of an advancing side to which webs of the laminating film are extended from the first and second rolls and bonded together.

8. The dual roll laminating film cartridge refill of claim 1, wherein the first connector includes a first pair of spool end retainers that form journal bearings for respective first spool ends of the first and second rolls, and wherein the journal bearings exhibit a clamping force on the first spool ends to create resistance in dispensing the laminating film from the respective first and second rolls.

9. The dual roll laminating film cartridge refill of claim 1, wherein the first connector includes a first pair of spool end retainers that clamp onto axial flange faces of respective first spool ends of the first and second rolls to create resistance in dispensing the laminating film from the respective first and second rolls.

10. A dual roll laminating film cartridge comprising:
a reusable cartridge portion; and
a dual roll laminating film cartridge refill of claim 1,
wherein the dual roll laminating cartridge refill is releasably retained in the reusable cartridge portion and removable therefrom without destructive means.

11. The dual roll laminating film cartridge of claim 10, wherein the reusable cartridge portion includes:
a cartridge frame having a first end with a first pair of receptacle areas configured to receive the first axial ends of the first and second rolls and a second end with a second pair of receptacle areas configured to receive the second axial ends of the first and second rolls, the cartridge frame defining a machine interface adapted for insertion into a laminating machine;
a bridge extending between the first and second ends of the cartridge frame to define a central article chute for the reception of articles to be laminated; and
a closure movable between open and closed positions with respect to the cartridge frame,
wherein the dual roll laminating film cartridge refill is selectively received by the respective first and second pairs of receptacle areas of the cartridge frame and secured in place by the closure in the closed position.

12. The dual roll laminating film cartridge of claim 10, wherein the keyed interface of the dual roll laminating film cartridge refill that enables only one prescribed orientation for assembly of the dual roll laminating film cartridge refill to the reusable cartridge portion includes a central portion of the first connector engageable with a first accommodating portion of the first end of the cartridge frame between the first pair of receptacle areas, and a central portion of the second connector engageable with a second accommodating portion of the second end of the cartridge frame between the second pair of receptacle areas.

13. The dual roll laminating film cartridge of claim 10, wherein wear surfaces for contacting respective spool ends of the first and second rolls in the dual roll laminating film cartridge refill are provided exclusively by the dual roll laminating film cartridge refill.

14. A dual roll laminating film cartridge comprising:
a reusable cartridge portion; and
a dual roll laminating film cartridge refill for a reusable cartridge loadable in a laminating machine, the refill comprising:
a first roll of continuous adhesive-coated translucent laminating film having a first axial end and a second axial end,
a second roll of continuous adhesive-coated translucent laminating film having a first axial end and a second axial end,
a first connector coupling the first axial ends of the first and second rolls at a predefined gap distance, and
a second connector independent from and spaced from the first connector, the second connector coupling the second axial ends of the first and second rolls at the predefined gap distance, wherein the first and second connectors are uniquely shaped and asymmetrical to provide a keyed interface to the reusable cartridge,
wherein the dual roll laminating film cartridge refill is releasably retained in the reusable cartridge portion and removable therefrom without destructive means, and,
wherein the first connector of the dual roll laminating film cartridge refill forms a primary male-female interface with the reusable cartridge portion, and a secondary male-female interface between the first connector and the reusable cartridge portion is incorporated within the primary male-female interface.

15. A dual roll laminating film cartridge refill for a reusable cartridge loadable in a laminating machine, the refill comprising:
a first roll of continuous adhesive-coated translucent laminating film having a first axial end and a second axial end;
a second roll of continuous adhesive-coated translucent laminating film having a first axial end and a second axial end;
a first connector coupling the first axial ends of the first and second rolls at a predefined gap distance;
a second connector independent from and spaced from the first connector, the second connector coupling the second axial ends of the first and second rolls at the predefined gap distance; and
wear surfaces configured to contact and press upon respective spool ends of the first and second rolls to create resistance in dispensing the laminating film from the respective first and second rolls.

16. The dual roll laminating film cartridge refill of claim 15, wherein the first and second connectors are uniquely shaped and asymmetrical to provide a keyed interface to the reusable cartridge.

17. The dual roll laminating film cartridge refill of claim 15, wherein the wear surfaces are provided by spool end retainers that form journal bearings for respective first spool ends of the first and second rolls.

18. The dual roll laminating film cartridge refill of claim 15, wherein the wear surfaces clamp onto axial flange faces of respective first spool ends of the first and second rolls.

19. The dual roll laminating film cartridge refill of claim 15, wherein the first connector includes respective spool end covers coupling respective first spool ends of the first and second rolls, and wherein the second connector includes respective spool end covers coupling respective second spool ends of the first and second rolls, and wherein, between the spool end covers, each of the first and second connectors includes a central portion including an outboard-facing finger hold recess to provide a grip for handling the dual roll laminating film cartridge refill.

20. A dual roll laminating film cartridge comprising:
a reusable cartridge portion; and
a dual roll laminating film cartridge refill of claim 15,
wherein the dual roll laminating film cartridge refill is releasably retained in the reusable cartridge portion and removable therefrom without destructive means, the reusable cartridge portion having no effect on the resistance in dispensing the laminating film from the respective first and second rolls.

* * * * *